(12) United States Patent (10) Patent No.: US 6,915,899 B2
Lin (45) Date of Patent: *Jul. 12, 2005

(54) SPINNER BAIT LURE BOX

(76) Inventor: Po-Hui Lin, No.9, Lane 96, Sec.2, Ho-Ping East Road, Taipei (TW)

(*) Notice: Subject to any disclaimer, the term of this patent is extended or adjusted under 35 U.S.C. 154(b) by 51 days.

This patent is subject to a terminal disclaimer.

(21) Appl. No.: 10/600,423

(22) Filed: Jun. 23, 2003

(65) Prior Publication Data

US 2004/0256260 A1 Dec. 23, 2004

(51) Int. Cl.$^7$ .......................... B65D 85/00; A01K 97/04
(52) U.S. Cl. ...................... 206/315.11; 43/54.1; 43/57.1
(58) Field of Search ................... 206/315.11, 564–565; 43/54.1, 57.1–57.2

(56) References Cited

U.S. PATENT DOCUMENTS

| | | | | |
|---|---|---|---|---|
| 2,846,806 A | * | 8/1958 | Gaines | 43/57.1 |
| 4,958,730 A | * | 9/1990 | Bunten | 206/315.11 |
| 5,228,232 A | * | 7/1993 | Miles | 43/57.1 |
| 6,079,148 A | * | 6/2000 | Yonenoi | 43/57.1 |
| 6,427,834 B1 | * | 8/2002 | Lin | 206/315.11 |
| 6,766,610 B1 | * | 7/2004 | Lin | 43/54.1 |

* cited by examiner

Primary Examiner—Bryon P. Gehman
(74) Attorney, Agent, or Firm—Rosenberg, Klein & Lee

(57) ABSTRACT

A spinner bait lure box includes an enclosure, anchoring spacers, and a top lid. The enclosure is of one-piece plastic injection-molded construction, with a plurality of recesses and pinch slots distributed across the inside of the enclosure. The enclosure thereby provides for the organized placement of fishing lures, such as spinner bait lures, to further facilitate their convenient and practical storage and retrieval.

1 Claim, 8 Drawing Sheets

SPINNER BAIT LURE BOX

BACKGROUND OF THE INVENTION

1). Field of the Invention

The invention herein relates to fishing equipment and accessories, specifically a spinner bait lure box comprised of an enclosure, anchoring spacers, and a top lid, the features of which include an enclosure of one-piece plastic injection-molded construction, with a plurality of recesses and pinch slots arrayed across the inside of the said enclosure, the enclosure thereby providing for the organized placement of fishing lures such as spinner bait lures to further facilitate their convenient and practical storage and retrieval.

2). Description of the Prior Art

Conventional fishing tackle boxes are utilized for the storage of line, hooks, floats, lead sinkers, lures, and other angling accessories; referring to FIG. 1, the said box 1 is typically comprised of a container 11 and a cover 12, the said container 11 divided into compartments 13 that are rectangular, square, or lengthy channels, and so on. The holding of all the said angling accessories by the conventional product can be problematic, especially for spinner bait lures. Currently marketed spinner bait lures are generally modeled after the shape of minnows with a hook attached at the abdomen or tail, but such lures are also available in a range of forms large and small such that if a quantity were placed into the compartments 13, users may suffer a puncture wound to the fingers while groping for a spinner bait lure or damage clothing due to snagging by a barbed hook. Furthermore, the situating of a plurality of spinner bait lures in such a limited area at the same time also results in the wear and breakage of the hooks at their abdominal and posterior aspects. However, to enhance the practicality and convenience of utilizing the conventional product, the applicant of the invention herein conducted extensive research and development based on many years of professional production experience to optimize the invention herein for even greater utility which, following repeated testing and improvement, culminated in the successful development of the spinner bait lure box of the present invention.

SUMMARY OF THE INVENTION

The primary objective of the invention herein is to provide a spinner bait lure box utilized for the organized placement of spinner bait lures as well as further facilitating their convenient and practical storage and retrieval.

To enable the examination committee a further understanding of the advantages and unique features of the structure of the present invention, the brief description of the drawings below are followed by the detailed description of the invention herein.

DETAILED DESCRIPTION OF THE INVENTION

Figure 1:
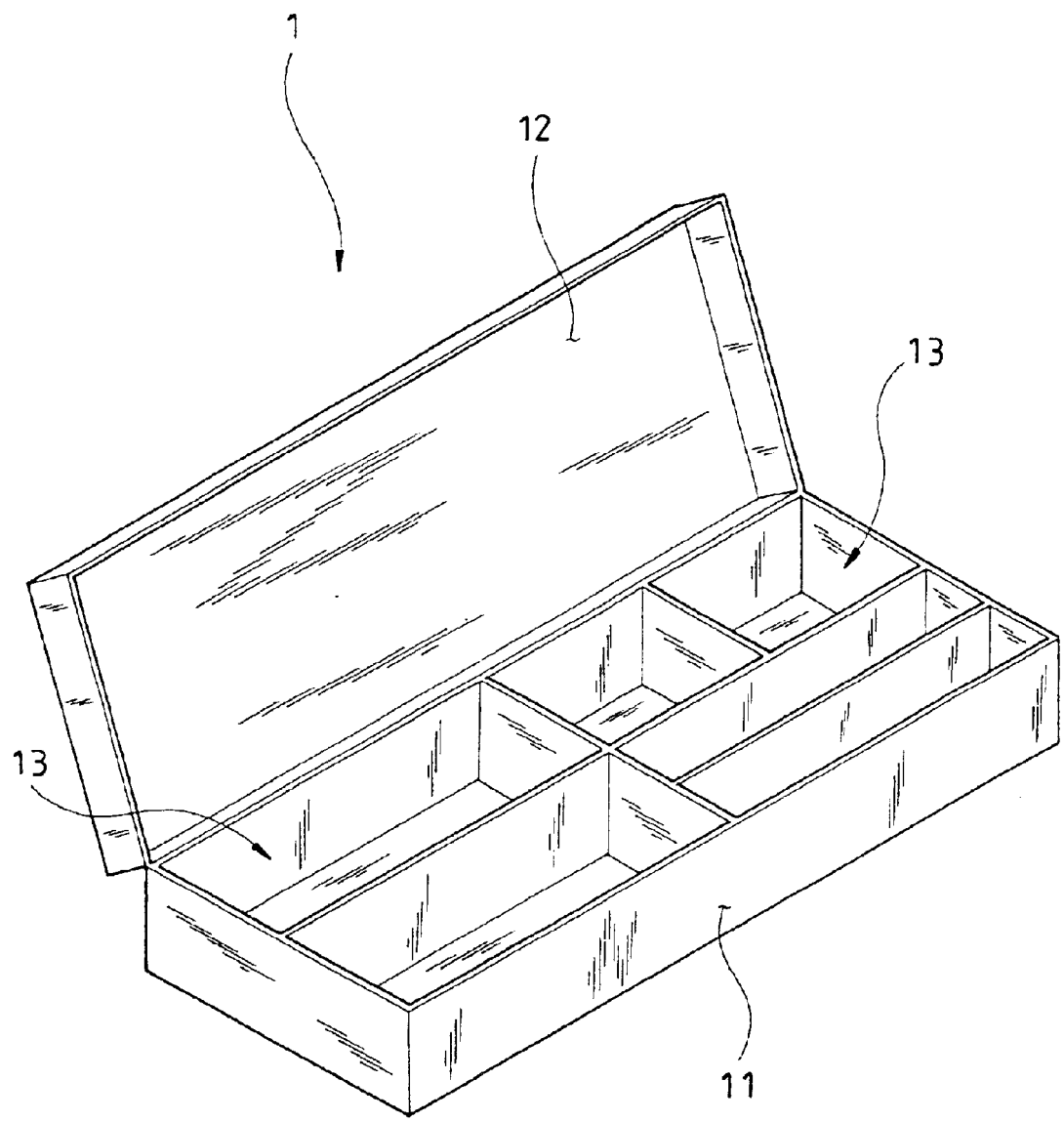
FIG. 1 is an isometric drawing of a conventional product.
Figure 2:
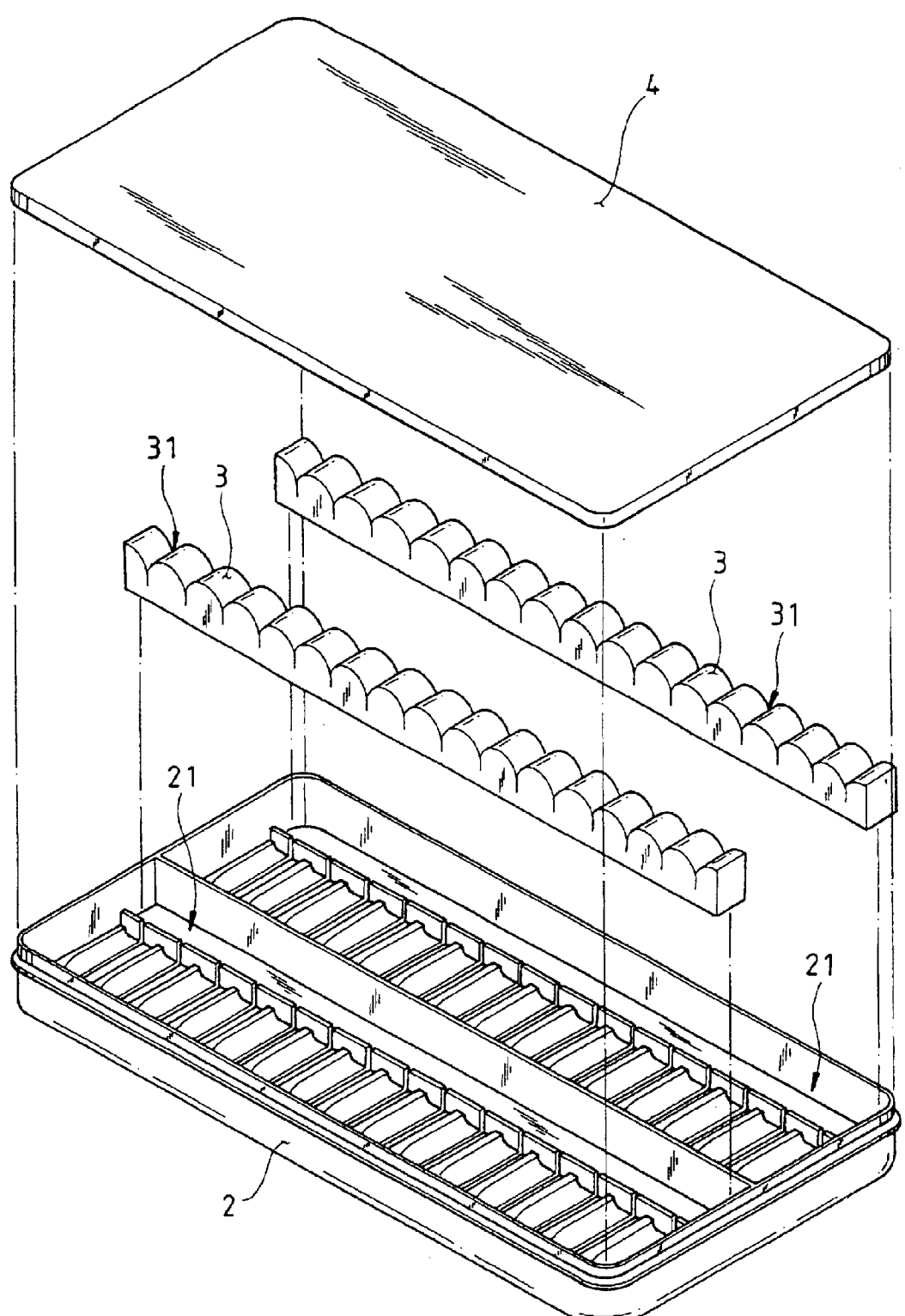
FIG. 2 is an exploded drawing of the invention herein.
Figure 3:
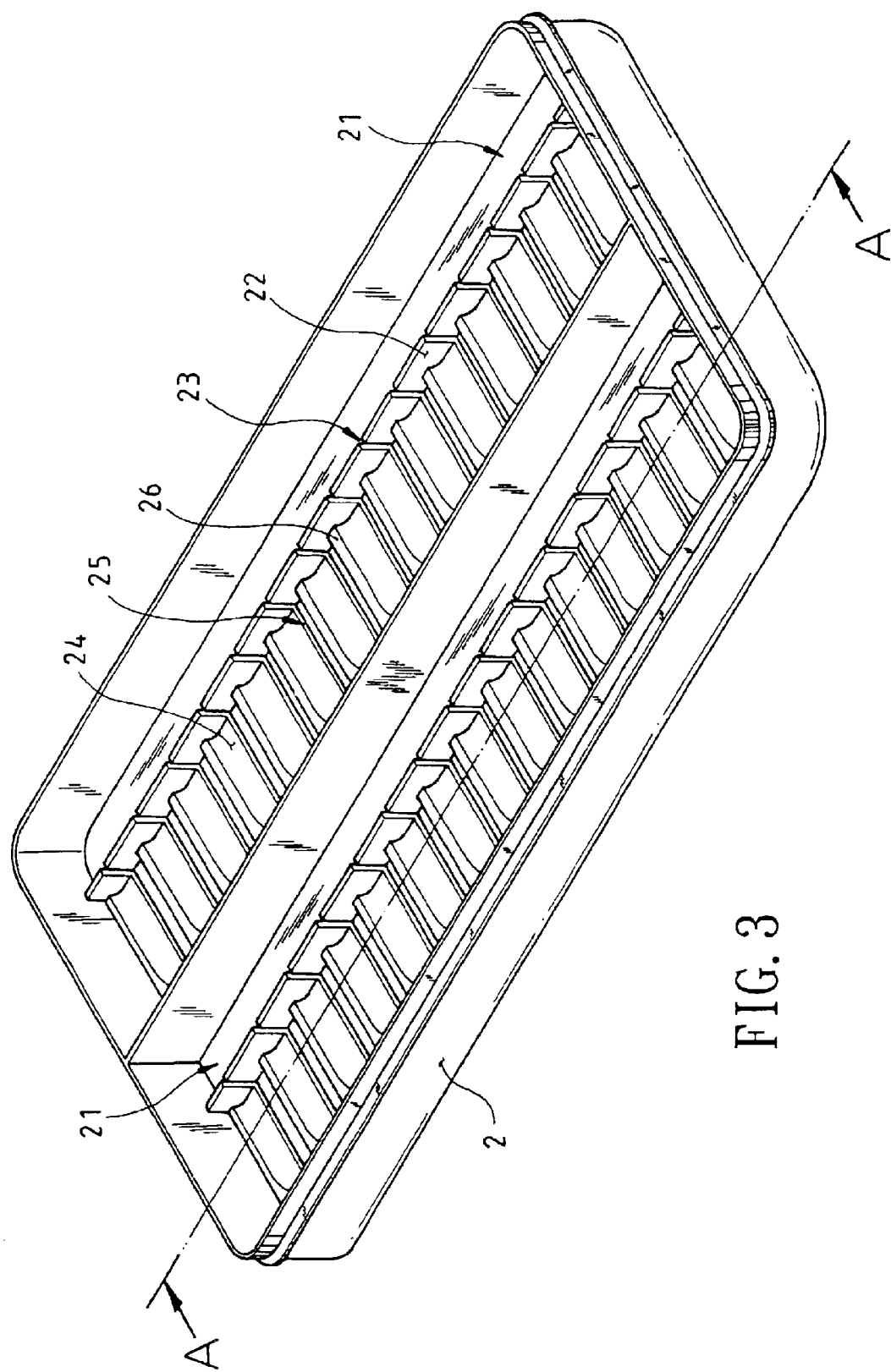
FIG. 3 is an isometric drawing of the enclosure 2 of the invention herein.
Figure 4:
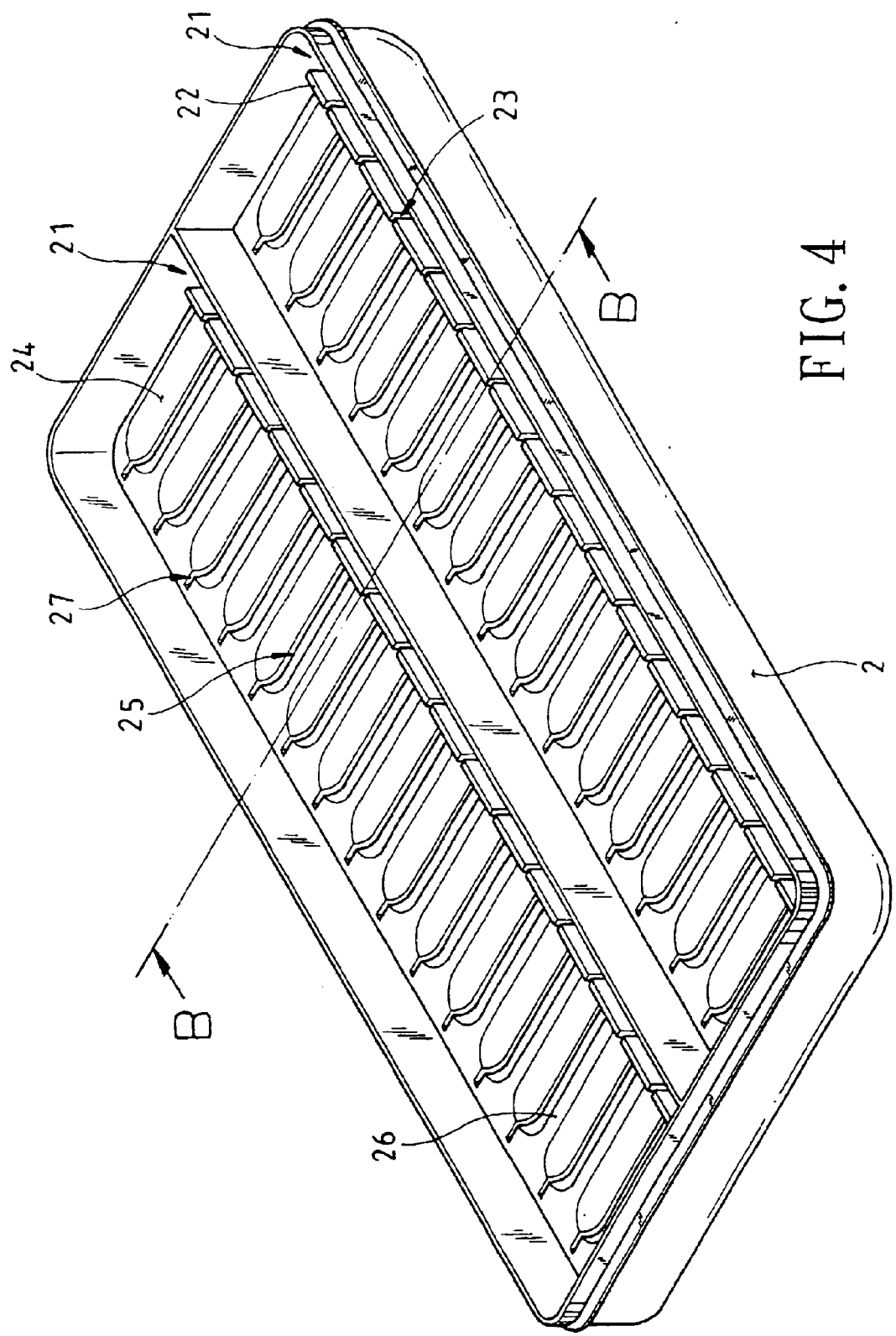
FIG. 4 is an isometric drawing of the enclosure 2 of the invention herein.
Figure 5:
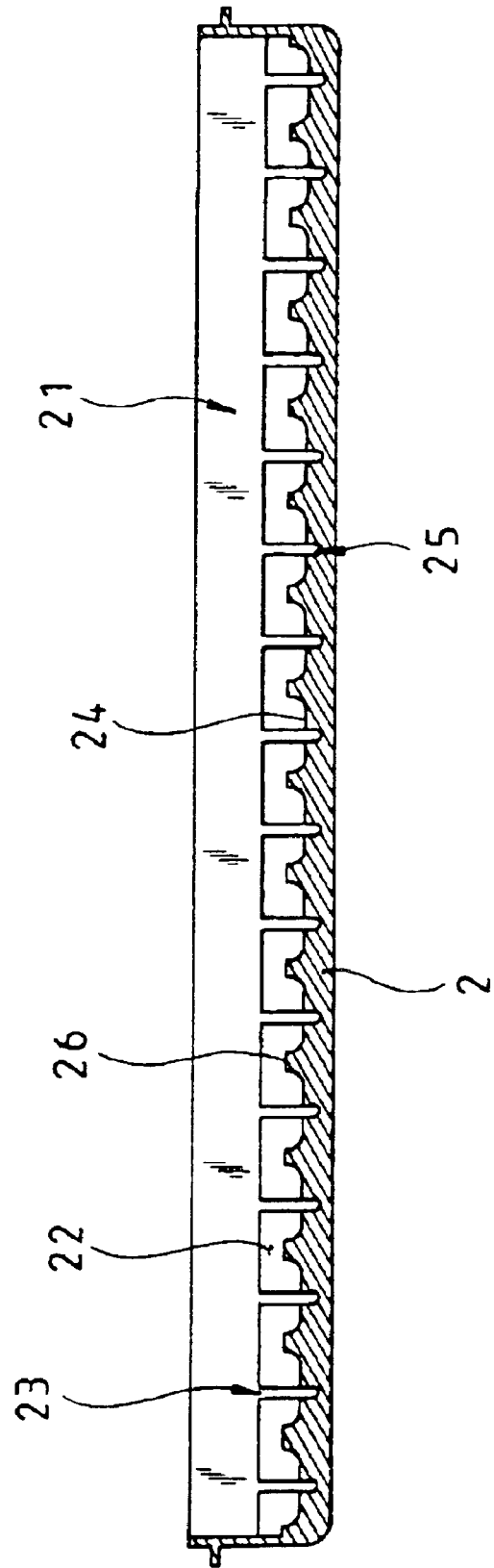
FIG. 5 is a cross-sectional drawing of FIG. 3, as viewed from the perspective of line A—A.
Figure 6:
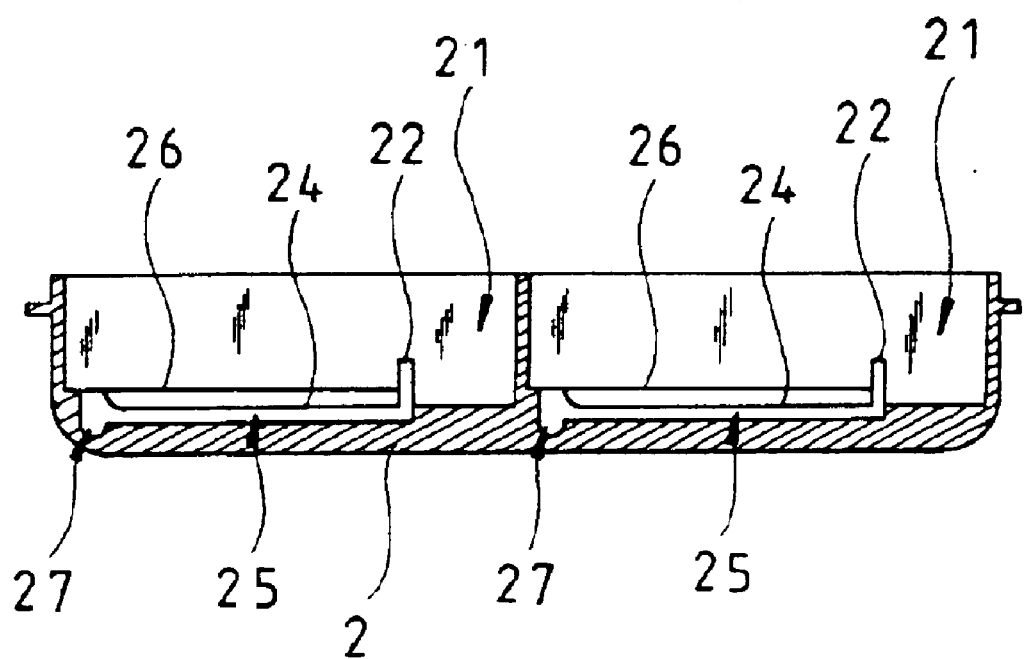
FIG. 6 is a cross-sectional drawing of FIG. 4, as viewed from the perspective of line B—B.

Referring to FIG. 3, FIG. 4, FIG. 5, and FIG. 6, the spinner bait lure box of the invention herein is comprised of an enclosure 2, anchoring spacers 3, and a top lid 4, wherein:

The enclosure 2 is a flat rectangular box of one-piece plastic injection-molded construction; a channel 21 is horizontally disposed along the upper extent and center of the said enclosure 2, a check plate 22 is situated at the lower edges of the said channels 21, and a plurality of locating slots 23 are evenly arrayed along the said check plates 22; a plurality of recesses 24 are downwardly contoured across the inside of the said enclosure 2, one end of each said recess 24 is curved and, furthermore, a locating groove 25 is formed vertically into the center of each said recess 24 such that it is aligned with a locating slot 23, a partially arcuate notch 27 is formed at the posterior end of each locating groove 25, and a projecting border 26 is present at the two sides of each recess 24.

Each anchoring spacer 3 is by design an elongate bar having wave-shaped contours across the top extent; a pinch slot 31 is formed along the center of the trough connecting every two wave-shaped peaks and, furthermore, each said pinch slot 31 is aligned with a locating slot 23 of the said enclosure 2; and each said anchoring spacer 3 is seated in a channel 21 of the enclosure 2.

The top lid 4 is rectangular in shape and fitted onto the upper edge of the enclosure 2 to complete the assembly of the spinner bait lure box of the invention herein.

Figure 7:
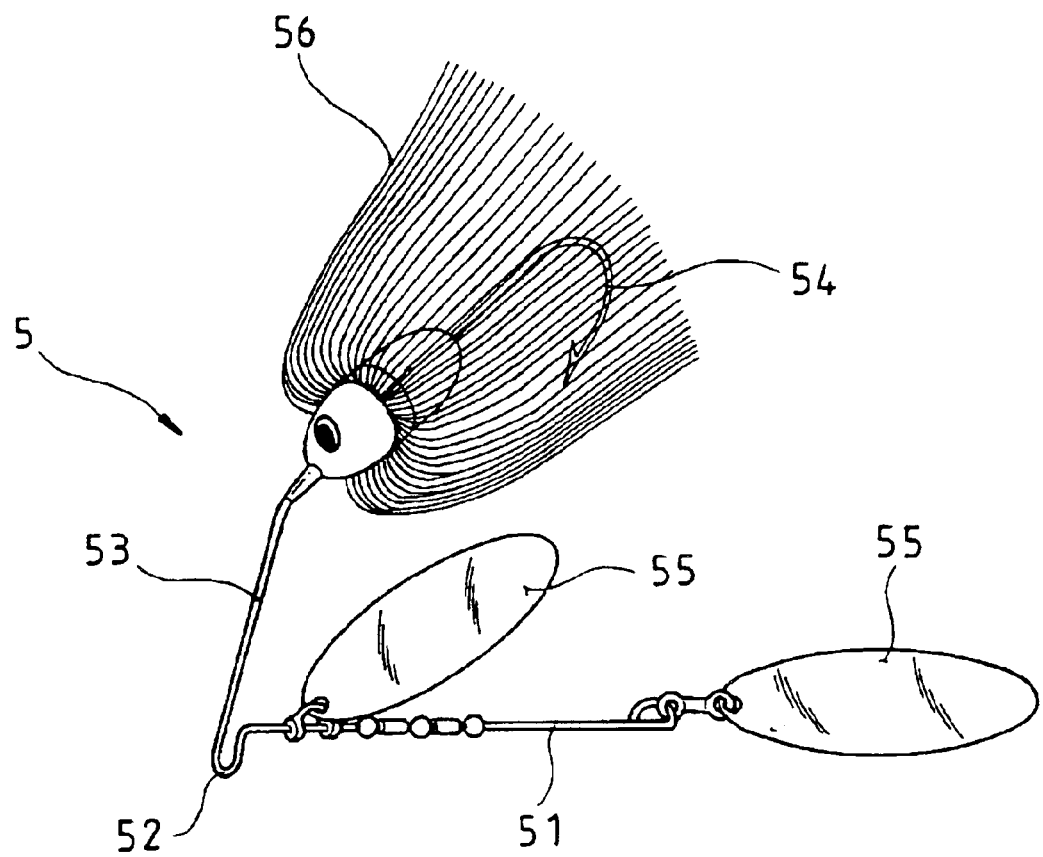
FIG. 7 is a drawing of the spinner bait lure 5 structure of the invention herein.
Figure 8:
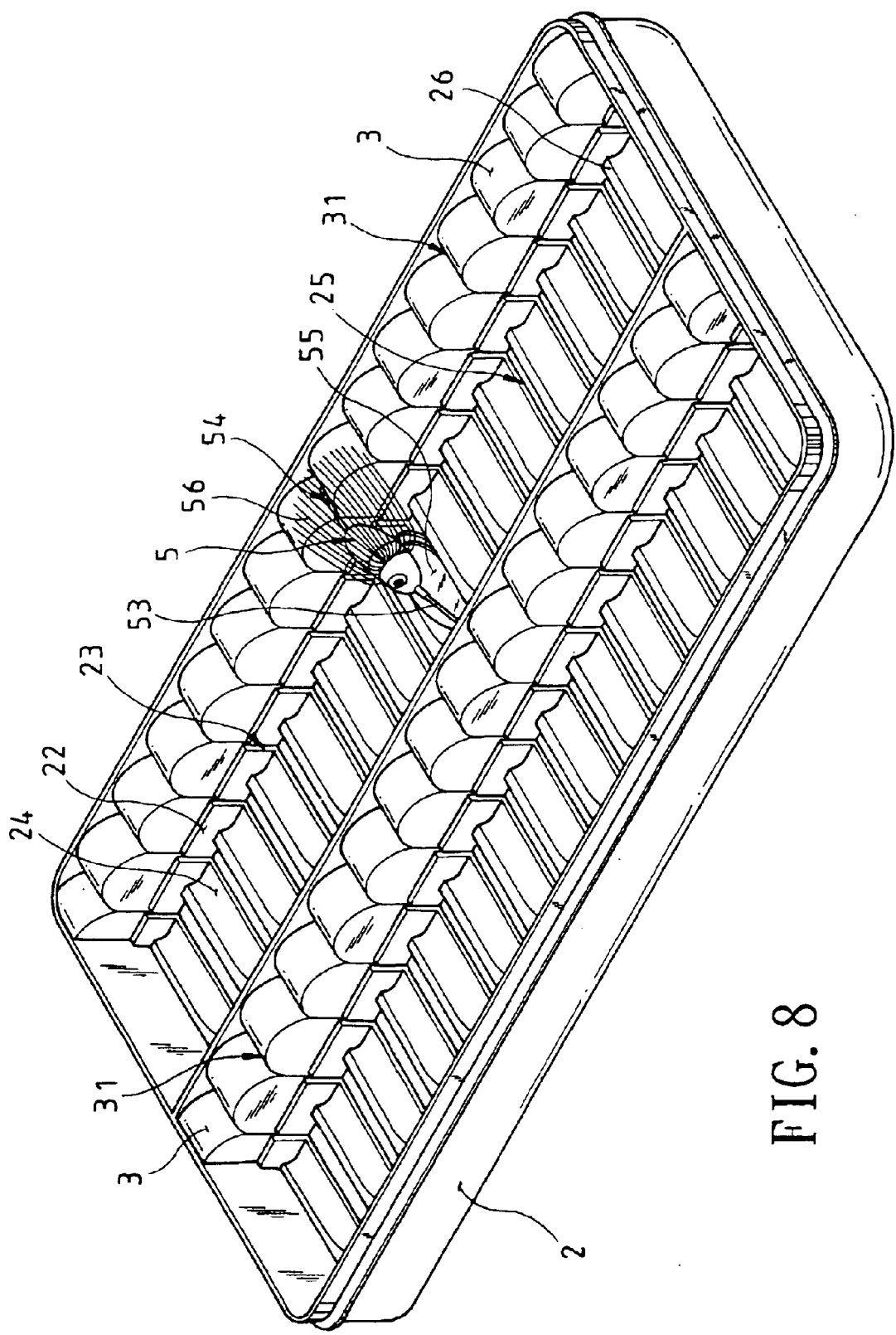
FIG. 8 is an isometric drawing of an embodiment of the invention herein.

The spinner bait lure box of the invention herein provides for the organized placement of fishing lures such as the spinner bait lure 5 shown in FIG. 7. The said spinner bait lure 5 has a level support rod 51 along its lower edge, a U-shaped mounting ring 52 is contoured at one end of the said level rod 51, an angled support rod 53 extends from the said mounting ring 52, and a barbed hook 54 is disposed at the top edge of the said spinner bait lure 5; additionally, the center and rear end of the said lever support rod 51 is respectively inserted through a long ovoid metal element 55 and a plurality of brightly colored strands 56 are situated around the barbed hook 54 on the said spinner bait lure 5.

In the said structural arrangement of the invention herein, referring to FIG. 2, FIG. 3, FIG. 4, FIG. 5, FIG. 6, FIG. 7, and FIG. 8, the level support rod 51 along the lower edge of the said spinner bait lure 5 is first admitted into a locating groove 25 inside the enclosure 2, the U-shaped mounting ring 52 contoured at one end of the level support rod 51 at lower edge of the said spinner bait lure 5 is placed into the semi-curved notch 27 formed at the posterior end of the enclosure 2 locating groove 25, and the long ovoid metal element 55 accommodating the insertion of the center and rear end of the said lever support rod 51 of the said spinner bait lure 5 is nested in one of the plurality of recesses 24 downwardly contoured across the inside of the said enclosure 2; additionally, the barbed hook 54 disposed at the top edge of the said spinner bait lure 5 is secured in a pinch slot 31 of the anchoring spacer 3, thereby providing for the organized placement of spinner bait lures 5 and further facilitating their convenient and practical storage and retrieval.

While the said arrangement of the present invention is certainly capable of achieving the claimed objectives and functions, the description of the most preferred embodiments of the invention herein is intended solely for the purpose of disclosing the features of the spinner bait lure box invention herein and shall not be construed as a limitation of the spirit and scope of the present invention and, furthermore, all modifications and adaptive substitutions such as varying the quantity of channels and overall dimensions shall remain protected by the claims of the invention herein.

In summation of the foregoing section, since the spinner bait lure box herein is an original invention within its product category that is capable of greater utility and practical value and, furthermore, an identical or similar product has never been observed on the market, the invention herein is submitted to the examination committee for review and the granting of the commensurate patent rights.

What is claimed is:

1. A spinner bait lure box comprised of an enclosure, anchoring spacers, and a top lid, wherein:

said enclosure is a flat rectangular box of one-piece plastic injection-molded construction having longitudinally extended front and rear sides; a pair of longitudinally directed channels are respectively disposed along said rear side and a central portion of said enclosure , each of said channels extends laterally from a longitudinally extending check plate disposed in said enclosure, and each of said check plates has a plurality of locating slots evenly arrayed therein in longitudinally spaced relationship; a plurality of recesses are downwardly contoured laterally across an inside of said enclosure, one end of each of said recesses is curved and, furthermore, a locating groove is formed laterally in a center of each of said recesses such that it is aligned with one of said locating slots, a partially arcuate notch is formed at a posterior end of each of said locating grooves, and a projecting border is disposed at opposing sides of each of said recesses;

each of said anchoring spacers is an elongate bar having an upper surface with a wave-shaped contour defined by a plurality of wave-shaped peaks and a plurality of troughs respectively disposed between adjacent pairs of said wave-shaped peaks, each of said troughs has a pinch slot formed centrally therein and, furthermore, each of said pinch slots is aligned with a respective one of said locating slots of said enclosure and each of said anchoring spacers is seated in a respective one of said channels of said enclosure;

said top lid has a rectangular shape and is fitted onto an upper edge of said enclosure.

* * * * *